(12) United States Patent
Welland et al.

(10) Patent No.: US 7,040,584 B2
(45) Date of Patent: May 9, 2006

(54) DRYWALL SPRAY GUN SUPPORT STAND

(76) Inventors: Gayann Welland, 18876 Nowata Rd., Apple Valley, CA (US) 92307; Eric J. P. Audet, 3254 Brockton Ave., Riverside, CA (US) 92501

( * ) Notice: Subject to any disclaimer, the term of this patent is extended or adjusted under 35 U.S.C. 154(b) by 23 days.

(21) Appl. No.: 10/390,952

(22) Filed: Mar. 18, 2003

(65) Prior Publication Data

US 2004/0182974 A1    Sep. 23, 2004

(51) Int. Cl.
*B01D 29/085*    (2006.01)

(52) U.S. Cl. .......................................... 248/146; 248/94

(58) Field of Classification Search ................ 548/146, 548/671, 676, 519, 523, 94, 148, 152, 150; 239/237
See application file for complete search history.

(56) References Cited

U.S. PATENT DOCUMENTS

| | | | | |
|---|---|---|---|---|
| 1,154,906 A | * | 9/1915 | Berkley | ........................ 248/146 |
| 1,750,803 A | * | 3/1930 | Hayden | ..................... 248/125.9 |
| 3,329,422 A | * | 7/1967 | Hajduk | ........................ 269/287 |
| D247,271 S | * | 2/1978 | Zipser | ..................... D11/130.1 |
| 4,344,645 A | * | 8/1982 | Kirk | ............................ 248/188 |
| 5,009,028 A | * | 4/1991 | Lorenzana et al. | ........... 47/40.5 |
| 5,199,676 A | * | 4/1993 | Kowalewski | ............... 248/149 |
| 5,292,015 A | * | 3/1994 | Bumbera | ..................... 211/189 |
| 5,335,575 A | * | 8/1994 | Hoshino | ..................... 248/436 |
| 6,040,514 A | * | 3/2000 | Liao | ............................ 248/127 |
| D440,477 S | * | 4/2001 | Pappas | .......................... D8/71 |
| 6,684,922 B1 | * | 2/2004 | Alston et al. | ................ 141/375 |
| 6,695,267 B1 | * | 2/2004 | Liao | ............................ 248/175 |
| D492,716 S | * | 7/2004 | Micheel | ........................ D17/22 |

OTHER PUBLICATIONS

Wallboard Tool Co., Inc., The Professional Hopper Gun Item No. 52-005, Operating Instructions, pp. 1-6.

* cited by examiner

*Primary Examiner*—Anita M. King
(74) *Attorney, Agent, or Firm*—Stetina Brunda Garred & Bruker

(57) ABSTRACT

A stand for supporting a drywall spray gun includes a base having a plurality of arms extending upwardly therefrom. The top ends of the arms abut against and support the hopper of the drywall spray gun, and support the spray gun in a generally vertical orientation. As such, the spray gun hopper is easier to fill and the spray gun can be placed down without spilling drywall compound from the hopper.

3 Claims, 5 Drawing Sheets ated with drywall compound and to facilitate easy filling of the spray
DRYWALL SPRAY GUN SUPPORT STAND

CROSS-REFERENCE TO RELATED APPLICATIONS (Not Applicable)

STATEMENT RE: FEDERALLY SPONSORED RESEARCH/DEVELOPMENT (Not Applicable)

BACKGROUND OF THE INVENTION

The present invention generally relates to support structures, and more specifically relates to a stand used to support a drywall spray gun to thereby avoid inadvertent spillage of drywall compound and to facilitate easy filling of the spray gun hopper with drywall compound.

Drywall paneling is commonly used to finish newly constructed and refurbished interior walls and ceiling. Ordinarily, individual drywall panels are placed against wall studs and/or ceiling rafters and are fastened thereto. Next, areas between the individual drywall panels are taped and troweled with drywall compound. Then, the drywall panels are typically textured with drywall compound to visually conceal surface finish imperfections.

Typically a conventional drywall spray gun is used to apply the drywall compound for the texturing process. As is well know, such conventional drywall spray guns include a hand held spray gun housing having a manually actuated trigger valve and nozzle. The lower portion of the spray gun includes a compressed air inlet coupling which can be rapidly attached to a conventional air compressor via a air hose. The upper portion of the spray gun housing includes and enlarged hopper which is sized to receive a substantial portion of drywall compound therein. Due to relative large size of the hopper as compared to the spray gun, as well as the substantial weight of drywall compound, the spray gun and hopper and not self-supporting i.e. do not remain in a vertical orientation without external support. Hence it is typical that during filling of the spray gun hopper with drywall compound, a single user supports the hopper in a vertical orientation while an additional user fills the hopper with drywall compound. Further, when it is desired to terminate the drywall texturing process, the spray gun and hopper typically must be manually supported to support the same in a vertical orientation such that the drywall compound does not inadvertently spill from the hopper.

Therefore, a substantial need exists in the art to provide a convenient means for supporting the spray gun in an upright vertical position such that filling the hopper is easily facilitated, and the spray gun can be easily set down without spilling the drywall compound from the hopper 110.

BRIEF SUMMARY OF THE INVENTION

In response to the above-noted needs, there is herein disclosed a drywall spray gun stand of the present invention. The stand is used for supporting a drywall spray gun that has a hopper with a plurality of sides, and a handle attached underneath the hopper, with an air hose attached to the handle. The stand of the present invention comprises a base and a plurality of support arms or columns, attached to the base and extending upwardly therefrom. Each of the arms has a top end which contacts one of the plurality of sides, to support the hopper at an elevation.

In one embodiment, the arms each include a notch at their respective top ends for self-registering and aligning the corners of the hopper therein, and the base includes at least one channel used to accommodate the air hose of the spray gun.

The stand allows the drywall spray gun to be easily and properly supported vertically upright when not in use. As such, the hopper can be easily filled with drywall compound by a single user. Also, if the hopper already has drywall compound therein, the spray gun can be easily set down without spillage of the drywall compound.

BRIEF DESCRIPTION OF THE DRAWINGS

These as well as other features of the present invention will become more apparent upon referenced to the drawings wherein.

DETAILED DESCRIPTION OF THE INVENTION

Figure 1:
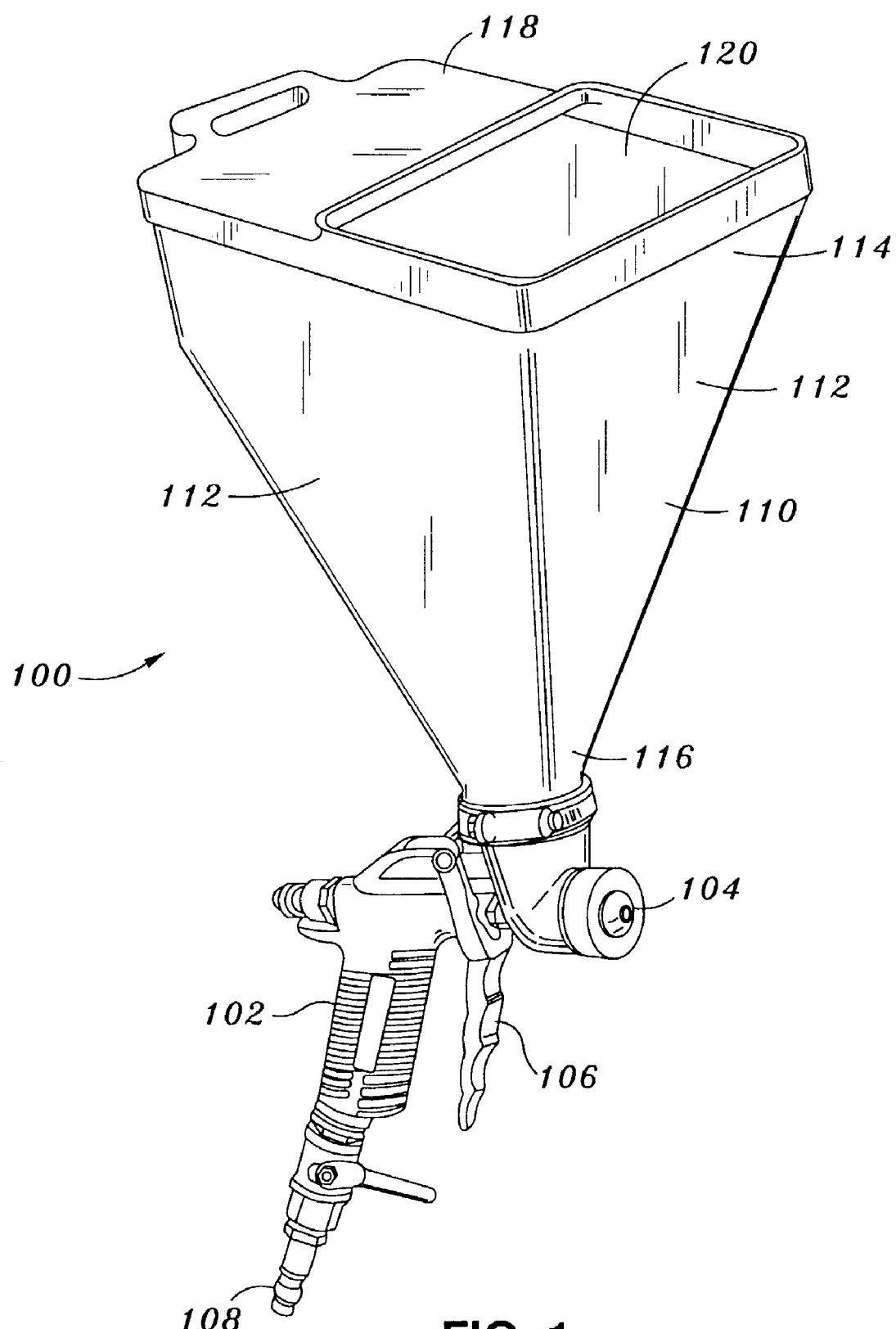
FIG. 1 is a perspective view of a prior art spray gun used to apply drywall compound to texture a wall surface.
Figure 2:
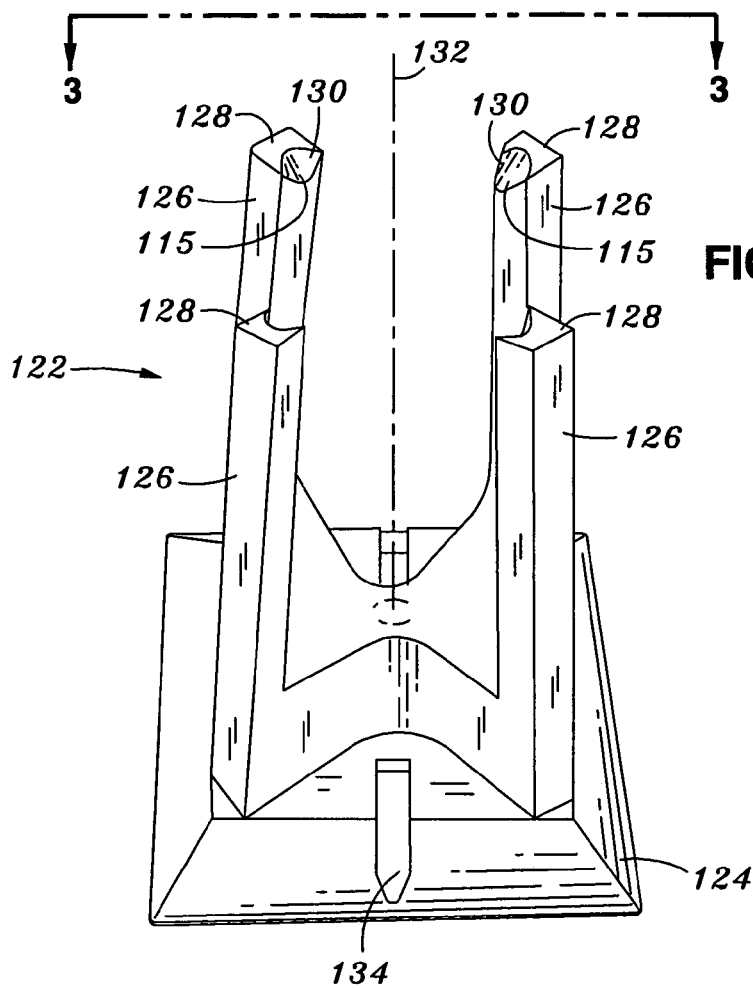
FIG. 2 is a perspective view of the drywall spray gun stand of the present invention.
Figure 3:
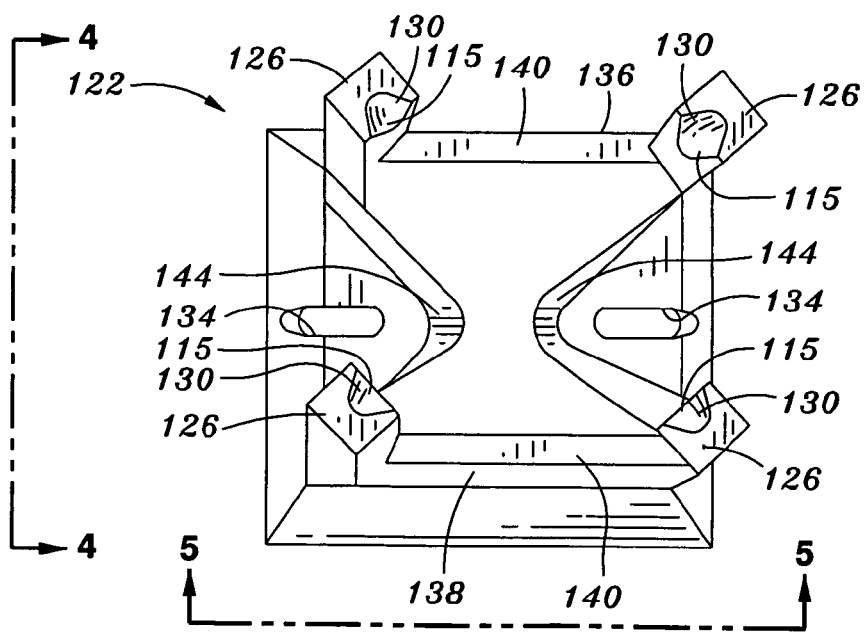
FIG. 3 is a top plan view of the drywall spray gun stand.
Figure 4:
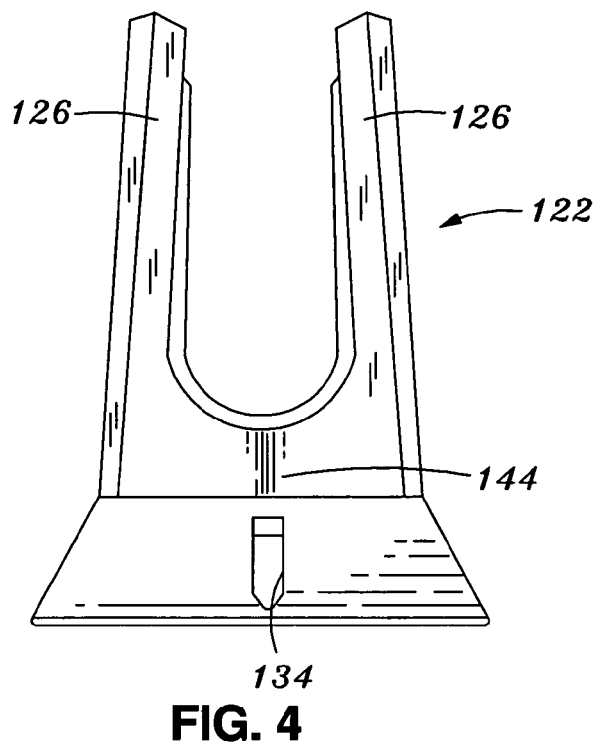
FIG. 4 is a front elevational view of the drywall spray gun stand.
Figure 5:
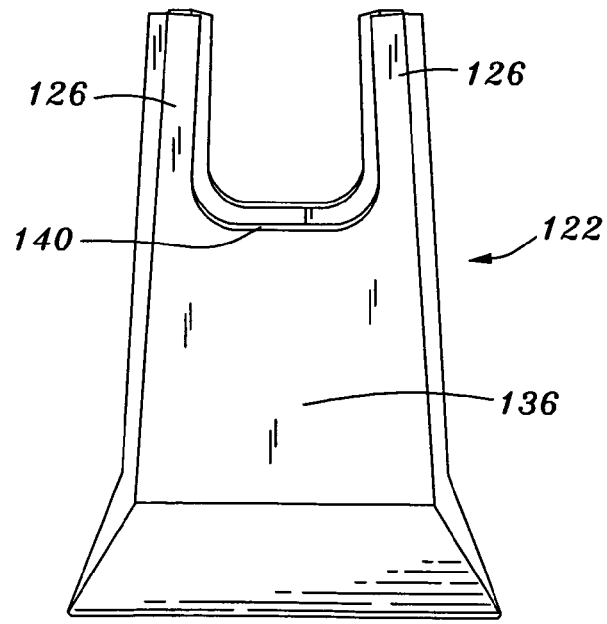
FIG. 5 is a side elevational view of the drywall spray gun stand, taken from FIG. 3.
Figure 6:
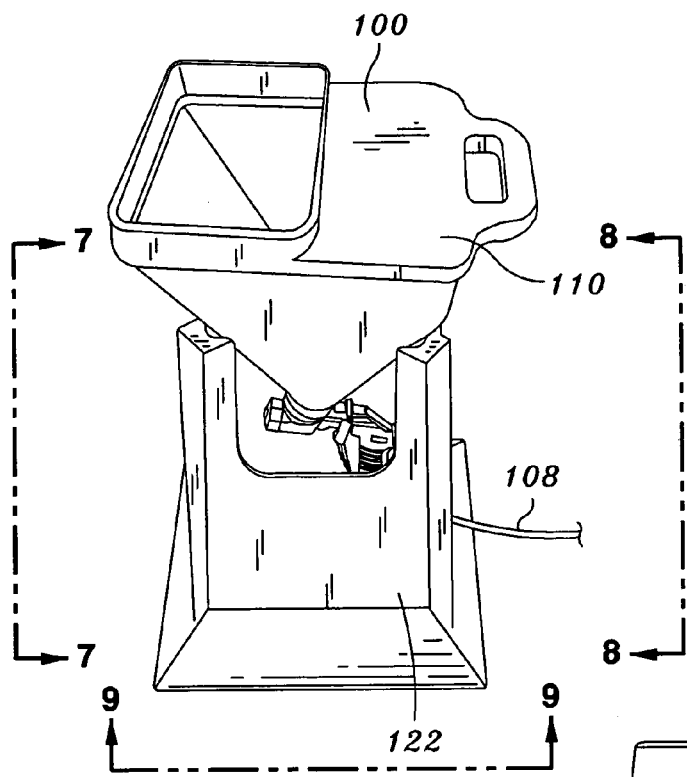
FIG. 6 is a perspective view of the drywall spray gun stand of FIG. 2 supporting the drywall spray gun and hopper.
Figure 7:
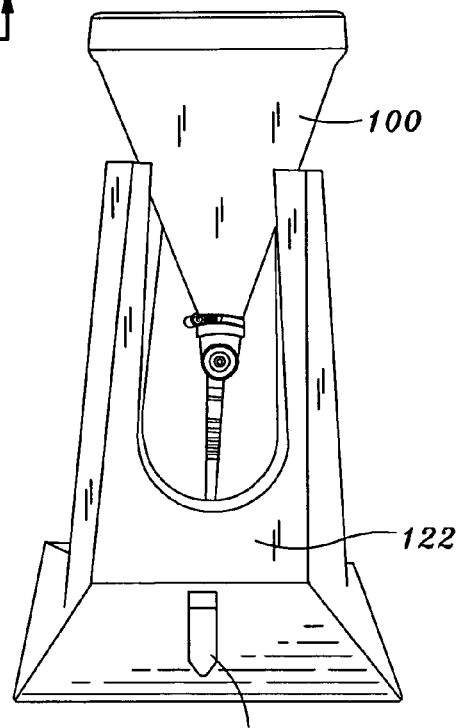
FIG. 7 is a front elevational view of the drywall spray gun stand supporting the drywall spray gun and hopper.

Referring now to the drawings wherein the showings are for purposes of illustrating preferred embodiments of the present invention only, and not for purposes of limiting the same, the drawings depict a conventional prior art drywall spray gun 100 and the novel drywall spray gun support stand 122 of the present invention.

As is well known, the drywall spray gun 100 is used to apply drywall compound during the wall/ceiling texturing process. As shown in FIG. 1, the spray gun 100 comprises a handle 102 by which the user holds the spray gun 100 when spraying. Also, the spray gun 100 comprises a nozzle 104 through which drywall compound is sprayed against the drywall (not shown). The spray gun 100 is typically attached to a compressed air source (not shown) via an air hose 108. Moreover, the spray gun 100 includes a trigger 106 which when manually actuated, allows compressed air to pass from the hose 108 and through the nozzle 104. The spray gun 100 further includes a hopper 110, which comprises a hollow container that is attached to the spray gun 100 and is adapted to be filled with drywall compound. Thus, when the trigger 106 is actuated, drywall compound moves from the hopper 110 to the nozzle 104 and is propelled at high speed out of the nozzle 104 by the compressed air.

As best shown in FIG. 1, the hopper 110 comprises an enclosure having four sides 112, two of which are in view in FIG. 1. The sides 112 are arranged such that the hopper 110 has an opening at a top end 114 and a bottom end 116. Also, the sides 112 are arranged such that the hopper 110 is tapered downwardly from the top end 114 to the bottom end 116. The bottom end 116 is attached to the spray gun 100. A cover 118 extends over the open top end 114, having an opening 120, which provides access to the top end 114 of the hopper 110. Drywall compound may be poured through the opening 120 of the cover 118 to thereby fill the hopper 110. As is known the tapered configuration of the hopper 110 directs the drywall compound into the nozzle 104 for subsequent expulsion from the spray gun 100.

The irregular shape of the spray gun 100 inhibits the spray gun 100 from being propped upright when not in use. Thus, if the hopper is full of drywall compound, it is difficult to set the spray gun 100 aside or down without spilling drywall compound out of the hopper 110.

FIG. 2 through 5 depict one embodiment of a drywall spray gun stand 122 of the present invention. The stand 122 of the present invention includes a rectangular base 124 that defines a generally vertical central axis 132, and a plurality of arms or columns 126 that upwardly extend from the base 124. In the embodiment shown, the stand 122 includes four arms 126, with one arm 126 disposed at each corner of the base 124 and each arm preferably being angled slightly toward the axis 132. A notch 130 is preferably included at a top end 128 of each arm 126. Each notch 130 is included at a top, inside edge 115 of the respective arm 126 as is shown in detail in FIGS. 2 and 3. As will be described in more detail below, the notches 130 are capable of contacting and self registering the hopper 110 of a spray gun 100 therein.

The stand 122 also preferably includes a plurality of channels 134. Each channels extends from the edge of the base 124 toward the axis 132 of the stand 122. In the embodiment shown, the stand 122 includes two channels 134 disposed on opposite sides of the base 124 between the respective arms 126. As will be discussed in more detail below, the channels 134 allow the hose 108 of the spray gun 100 to be accommodated therein.

To provide increased stability to the arms 126, the stand 122 preferably includes a first wall 136 and a second wall 138. The first and second walls 136, 138 each extend perpendicularly from the base 124. The first wall 136 is connected to and extends between two of the arms 126, and the second wall 138 is similarly connected to the two opposing arms 126 of the stand 122. The first and second walls 136, 138 each include a top edge 140 and preferably the top edge 140 lies below the top end 128 of each arm 126.

In the preferred embodiment, all components of the stand 122 shown in FIGS. 2 through 5 are integrally attached and are preferably formed by rotational molding processes. However, the stand 122 may be formed by processes known by those skilled in the art without departing from the spirit of the invention.

Turning now to FIGS. 6 through 9, the drywall spray gun stand 122 is depicted supporting the spray gun 100 of FIG. 1. As shown, when the spray gun 100 is supported by the stand 122, the top ends 128 of the four arms 126 contact the hopper 110. As such, a portion of the hopper 110 extends above the top ends 128 of the arms 126, and the outward taper of the hopper 110 causes the weight of the same to be supported by the arms 126. Moreover, the arms 126 are tall enough such that the hopper 110 is supported at an elevation above the base 124 to thereby allow the handle 102 of the spray gun 100 to be positioned above the base 124 within one of the cut-outs 144.

Also, the notches 130 are sized to allow the corners of the hopper 110 to partially fit therein. Thus, the notches 130 self-register and align the hopper with the stand and physically capture the hopper 110, thus inhibiting the hopper 110 from rotating therein.

Figure 8:
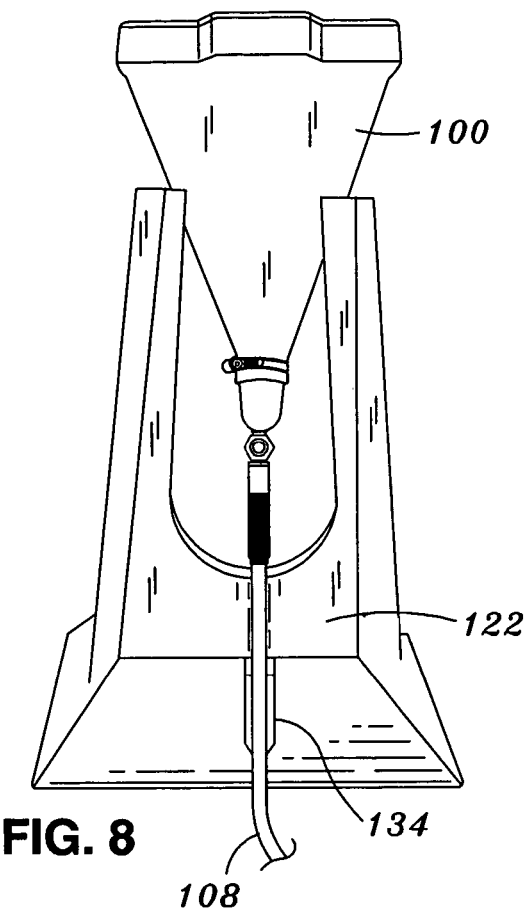
FIG. 8 is a rear elevational view of the drywall spray gun stand supporting the drywall spray and hopper.
Figure 9:
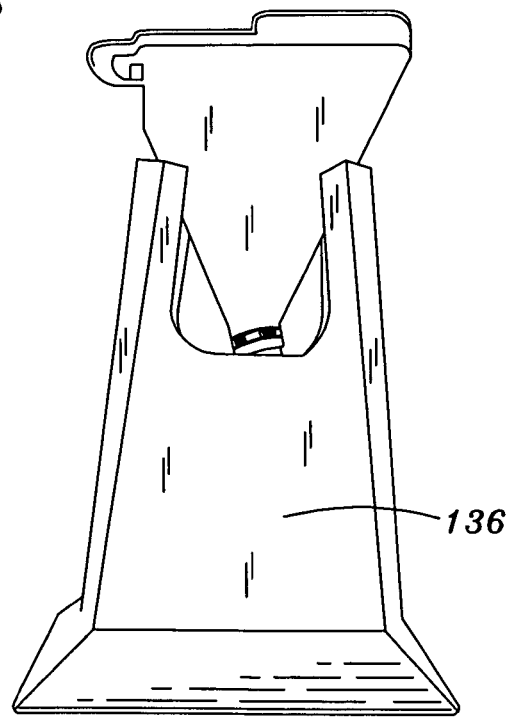
FIG. 9 is a side elevational view of the drywall spray gun stand supporting the drywall spray gun and hopper.

Furthermore, the elevated position of the spray gun 100 allows the hose 108 to fit within the channel 134, as is specifically shown in FIG. 8. As such, the hose 108 is accommodated therein.

Thus, the drywall spray gun stand 122 allows a drywall spray gun 100 to be quickly and easily supported in an upright position when not in use. When the spray gun 100 hopper 110 needs to be filled, a user can place the spray gun 100 on the stand 122 and pour drywall compound into the hopper 110 without the aid of an additional worker. Also, if the hopper 110 is full but the user needs to set the spray gun 100 down, the user can set the spray gun 100 upon the stand 122, and inadvertent spillage of the drywall compound is unlikely. Therefore, the drywall spray gun stand 122 advantageously facilitates easy filling of the hopper 110 and also reduces inadvertent spillage of drywall compound.

This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process may be implemented by one of skill in the art in view of this disclosure. For example, it is specifically noted that the stand 122 could be altered in dimension and shape to accommodate a spray gun 100 different from the embodiment shown in FIG. 1 and FIGS. 6 through 9 without departing from the spirt of the invention.

What is claimed is:

1. A drywall spray gun stand used for supporting a drywall spray gun that has a hopper with a plurality of sides, and a handle attached underneath the hopper, with a hose attached to the handle, the drywall spray gun stand comprising:
    a base including at least one channel having a width for receiving the hose of the drywall spray gun; and
    four arms attached to the base and upwardly extending therefrom, wherein each of the arms has a top end capable of contacting at least one of the plurality of sides of the hopper to collectively support the hopper;
    wherein each arm comprises a notch at the respective top end, each notch capable of receiving a portion of at least one of the sides of the hopper;
    wherein first and second arms are connected to a first wall, and wherein third and fourth arms are connected by a second wall, wherein the first and second walls each have a top edge that lies below the top ends of the arms.

2. A drywall spray gun stand used for supporting a drywall spray gun that has a hopper with a plurality of sides, and a handle attached underneath the hopper, with a hose attached to the handle, the drywall spray gun stand comprising:
    a base including at least one channel having a width for receiving the hose of the drywall spray gun; and
    a plurality of arms, attached to the base and upwardly extending therefrom, wherein each of the arms has a top end capable of contacting at least one of the plurality of sides of hopper to collectively support the hopper;
    wherein each of the plurality of arms is tapered inwardly toward each other from the base;
    wherein each arm comprises a notch at the respective top end, each notch capable of receiving a portion of at least one of the sides of the hopper, said notches being capable of self registering the hopper with the stand when the drywall spray gun is supported by the drywall spray gun stand.

3. A drywall spray gun stand used for supporting a drywall spray gun that has a hopper with a plurality of sides, and a handle attached underneath the hopper, with a hose attached to the handle, the drywall spray gun stand comprising:
   a base; and
   a plurality of arms attached to the base and upwardly extending therefrom, wherein each of the arms has a top end capable of contacting at least one of the plurality of sides of the hopper to collectively support the hopper, the arms including first and second arms connected to a first wall and third and fourth arms connected by a second wall, wherein the first and second walls each having a top edge that lies below the top ends of the arms, and each arm comprises a notch at the respective top end, each notch is capable of receiving a portion of at least one of the sides of the hopper;
   wherein at least four of the arms are tapered inwardly toward each other from the base.

* * * * *